United States Patent Office 2,851,379
Patented Sept. 9, 1958

2,851,379

PROCESS OF IMPREGNATING MATERIAL WITH A RESINOUS BONDING COMPOSITION

Johann Josef Peter Staudinger, Dinas Powis, and Howard Williams, Barry, Wales, assignors to The Distillers Company Limited, Edinburgh, Scotland, a British company No Drawing. Application November 5, 1954
Serial No. 467,218

Claims priority, application Great Britain
November 18, 1953

9 Claims. (Cl. 117—161)

The present invention relates to the production of articles in which various fibrous or other materials are bonded together by a cured resinous composition. In particular it relates to a process for the production of such articles in which the resinous composition used for the bonding, laminating or impregnating, etc., is based on an unsaturated polyester resin. It further relates to the bonding compositions so used.

It is well known that useful bonded articles, often referred to as laminated articles, may be prepared from various absorbent materials such as glass fibre cloth and mats, cotton, cellulose pulp, natural and artificial fibres, by impregnating or laminating absorbent material with a suitable bonding composition and thereafter curing the impregnated material which may be shaped to the form of a mould.

When unsaturated polyester resins are mixed with mono-vinyl aromatic compounds such as styrene, particularly valuable bonding compositions result which have the ability to cure under comparatively low pressures and at low temperatures. This property of easy and rapid cure is particularly valuable in the manufacture of large objects, such as boats, tubes, ducts, car bodies and portions of aeroplanes.

By "unsaturated polyester resin" is meant throughout this specification a resin, the molecules of which each contain at least two ester groups and two ethylenically unsaturated portions through which interpolymerisation among themselves and with vinylidene aromatic compounds may take place. Such unsaturated polyester resins are prepared by the interesterification of suitable dibasic or polybasic acids with suitable alcohols to give polyesters in which either the alcoholic or the acidic portion thereof possess the ethylenic unsaturation. One class of polyester resins may be derived from the esterification of saturated dibasic acids, such as phthalic acid, adipic acid, succinic acid or sebacic acid, with unsaturated alcohols such as allyl or substituted allyl alcohols. Another class of unsaturated polyester resins which is particularly valuable in the production of bonding compositions may be obtained by esterifying saturated dihydric alcohols, such as ethylene glycol, diethylene glycol, triethylene glycol, trimethylene glycol, α-propylene glycol and 1:3-butylene glycol with α-unsaturated α,β-dicarboxylic acids, such as maleic, fumaric, itaconic and citraconic acids. This type of unsaturated polyester resin may be modified by replacing some of the unsaturated dibasic acids with an equivalent quantity of an acid, such as succinic, adipic, sebacic, phthalic, azelaic, tetrahydrophthalic, endomethylene tetrahydrophthalic or hexachloroendomethylene tetrahydrophthalic acids, which do not contain groups polymerisably reactive with respect to organic substances containing vinylidene groups.

The unsaturated polyester resins may be prepared by replacing the various dibasic acids described above with equivalent quantities of the anhydrides where the latter are readily available and, if desired, mixtures of more than one reactant from each group may be employed. When it is desired that the final composition shall contain more than one single ester it may be convenient to mix the acids or alcohols, which may include other polyhydric alcohols such as glycerol, prior to commencing the esterification reaction, to add one or more materials to a partially reacted mixture or to mix two or more esters.

In order to produce bonding compositions, which may be cured at low temperatures, i. e. below 80° C., it is necessary that the compositions should contain a proportion of a mono-ethylenically unsaturated aromatic compound most suitably having the formula

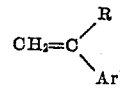

which is inter-polymerisable with the unsaturated polyester. In the formula Ar represents an aromatic group and R may represent a hydrogen or chlorine atom or a methyl group. Styrene gives rise to particularly valuable compositions, but other mono-ethylenically unsaturated aromatic compounds such as the vinyl toluenes, α-methyl-styrene, any of the mono- or dichlorstyrenes, alkoxy or hydroxy styrenes or mixtures of such compounds may be employed.

The proportion of unsaturated polyester resin to mono-ethylenically unsaturated aromatic compound necessary in the production of low temperature curing bonding compositions varies according to the nature of the compositions but usually such compositions contain between 20 and 90% and preferably between 40 and 80% by weight of the unsaturated polyester resin.

The bonding compositions of the type described above may be cured by the action of heat alone or, alternatively, by the addition to the mass of suitable curing catalysts. Such catalysts include organic peroxides such as benzoyl peroxide, lauryl peroxide, isopropylbenzene hydroperoxide, tertiary butyl benzene hydroperoxide, methyl ethyl ketone peroxide and 1-hydroxy cyclohexyl hydroperoxide-1. The rate of cure of the laminating composition may also be modified by the addition of suitable inhibitors, such as hydroquinone, α-naphthol, tertiary butyl catechol, benzaldehyde or tetrachloroquinone and promoters such as certain amines like dimethyl aniline, diethyl aniline, di-n-propyl aniline, dimethyl-para-toluidine, diethyl-α-naphthylamine, para-dimethylamino azobenzene and dimethyl meta-aminophenol and metallic salts such as cobalt and manganese naphthenate. The use of such curing catalysts and promoters enables the cure of the bonding composition to be brought about at low temperatures, e. g. room temperature, which is particularly valuable in the production of bonded articles.

The low temperature curing bonding compositions which have been prepared from the above mentioned materials are liquids of low viscosity due to the presence of the monovinylidene aromatic compound and consequently they readily impregnate or coat the absorbent material from which the laminated articles are to be made. However, the use of such relatively mobile compositions leads to difficulties due to drainage of the bonding composition away from the absorbent material before cure of the former has been effected. This difficulty is particularly pronounced when large objects with extensive vertical areas are being made. The uncured bonding composition tends to flow away from spaces between the layers of absorbent material, leaving so-called "starved spots" or areas where there will be insufficient cured composition in the finished article. Even after sufficient curing catalyst, promoter and the like to cause the resultant composition to set at room temperature have been added, there is a considerable induction period before any appreciable increase in viscosity takes place. While the existence of this induction period is valuable in that it provides a "pot life" during which the composition can be handled, it aggravates the drainage difficulties referred to above.

An object of the present invention is to provide a process for the production of bonded articles in which the above mentioned difficulties are substantially reduced. A further object of the present invention is to provide low temperature curing bonding compositions having improved physical characteristics both in the cured and uncured states.

It has now been found that if a proportion of a finely divided vinyl chloride polymer e. g. polyvinyl chloride is incorporated into low temperature curing bonding compositions of the type described above, it markedly modifies their flow characteristics and considerably reduces their tendency to drain away from the absorbent material when being used in the production of laminated articles.

Moreover bonded articles prepared from bonding compositions containing a finely divided vinyl chloride polymer have superior resistance to cracking and crazing, lower water absorption and improved impact strength as compared with articles prepared from similar compositions not containing the finely divided vinyl chloride polymer. Furthermore, the presence of the vinyl chloride polymer reduces the inflammability of the article.

Accordingly, the present invention provides a process for the production of bonded articles which comprises impregnating absorbing material with a laminating composition comprising an unsaturated polyester resin, a monovinylidene aromatic compound which is interpolymerisable therewith and a finely divided polymer containing a major proportion of vinyl chloride units in its molecular structure and thereafter allowing said mixture to cure at an ambient temperature below 80° C.

Any absorbent material which has been used for the production of bonded articles in conjunction with unsaturated polyester resins, may be used in the process of the present invention. Such materials include cotton, cellulose pulp and materials made from natural and artificial mineral or organic fibres such as glass fibre cloth or mats, asbestos and slag wool.

Any unsaturated polyester resin and monovinylidene aromatic compound of the type described above may be used in the process of the present invention. Particularly valuable bonding compositions are obtained from unsaturated polyester resins derived from the esterification of unsaturated dibasic acids with dihydric alcohols which have been modified by inclusion in the reaction mixture of proportions of saturated dibasic acids as described above. Of the monovinylidene aromatic compounds which may be employed in the process of the present invention, the use of styrene is preferred. When styrene is employed particularly valuable bonding compositions may be prepared from modified unsaturated polyester resins, i. e. those polyester resins derived from esterification of a dihydric alcohol with a mixture of saturated and unsaturated dibasic acids. With these particular bonding compositions it is preferred that the ratio of styrene to modified polyester resin shall be in the range of 1:3 to 1:1.

The finely divided polymer containing a major proportion of vinyl chloride units in its molecular structure is most suitably polyvinyl chloride but it is possible to use polymers derived from the polymerisation of vinyl chloride with minor proportions of suitable copolymerisable compounds, such as vinylidene chloride, vinyl acetate and acrylonitrile. Copolymers derived from the copolymerisation of vinyl chloride with less than 10% vinyl acetate give excellent results. It is within the scope of the present invention to use mixtures of these finely divided polymers containing a major proportion of vinyl chloride units in their molecular structure. Most of the well known fillers for vinyl chloride polymers, such as silica, clay and whiting, may be mixed in the finely divided polymer before it is incorporated in the laminating compositions of the present invention.

In order to obtain suitable bonding compositions for the process of the present invention, it is essential to use the vinyl chloride polymer in a finely divided form. Particularly satisfactory results are obtained when the polymer containing the vinyl chloride units is used in the form of a free-flowing powder of high molecular weight, such as is obtained without further treatment from the usual emulsion polymerisation processes. Most suitably the diameters of the finely divided vinyl chloride polymer particles should lie in the range 0.01 mu to 0.1 mu, although paste-forming vinyl chloride polymer particles with diameters up to 10 or even 20 mu may be successfully employed. Polymers which have been prepared by a granular polymerisation process, having an average particle size in the range 20 to 200 mu are generally less suitable for the process of the present invention. Many dispersion polymerisation procedures will give finely divided polymer particles whose diameters vary over a considerable range, for instance from 0.01 mu to 200 mu, and it has been found that such finely divided polymers containing polymer particles of widely varying diameters may be used in the process of the present invention. When copolymers, for example vinyl chloride, vinyl acetate copolymers containing not more than 10% of the latter are employed, it is found that slightly larger particle sizes can be tolerated without detriment to the final composition.

The proportion of the finely divided vinyl chloride polymer present in the bonding compositions of the present invention may be varied considerably according to the conditions under which they are to be used. Particularly satisfactory results are obtained when using a proportion of polymer which is of the order of 10 to 20% on the weight of the bonding composition. As a general rule it is found that an increase in the proportion of the vinyl chloride polymer will require an increase in the proportion of the monovinylidene aromatic compound to the unsaturated polyester resin in order to give the most suitable bonding compositions.

The incorporation of the finely divided vinyl chloride polymer into the bonding composition may be carried out by high speed stirring or by milling in one of the usual type of mills which are employed for dispersing pigments in paint media. The preferred type of mixer is one which does not stir high proportions of air into the composition because it has been found that dispersed air renders the handling of the composition more difficult and, in some cases, adversely affects the curing of the resin. Good results are obtained by the use of a mixer of the "Peerless" (registered trademark) type. In order to aid the dispersion of the vinyl chloride polymer in the bonding compositon it is often convenient to add small quantities of suitable wetting or dispersing agents to the mixture. Such agents include soaps, "Emulphor O," "Aerosol OT" and "Lanette wax." Long chain fatty alcohols and polyethylene oxide type compounds may also be added. ("Emulphor O" is a condensation product of oleyl alcohol with a molar excess of ethylene oxide. "Aerosol OT" is a wetting agent of the sulphonated ester type. "Lanette wax" is a mixture of cetyl and stearyl alcohols.)

It is found that the impregnation of the absorbent material is often facilitated by the incorporation in the bonding composition of small quantities of wetting or dispersing agents of the same type as those which may be used to aid the dispersion of the polymer in the composition. Most suitably the agent is added to either the unsaturated polyester resin mixture or the vinyl chloride polymer before their mixture in such a quantity that it may serve both to aid the dispersion of the polymer and to aid the subsequent impregnation of the absorbent material.

The quantity of wetting or dispersing agents present in the bonding compositions of the present invention is not critical, but most suitably quantities of 1 to 5% by weight on the vinyl chloride polymer present may be employed. Many of the known emulsion or dispersion polymerisation processes lead to the production of finely divided vinyl chloride polymer particles containing wetting or dispersing agents and accordingly such polymers are particularly useful for the process of the present invention when it is desired that the bonding composition should contain a wetting or dispersing agent.

The bonding compositions containing the finely divided vinyl chloride polymer particles are often highly thixotropic liquids and are thus well suited for the process of the present invention. The degree of the thixotropy of the compositions and their flow properties in general depend on the various variable factors of the composition such as the nature of the unsaturated polyester resin, the monovinylidene aromatic compound mixed therewith and, particularly, the amount and average particle size of the vinyl chloride polymer present in the composition. Thus by adjusting the above mentioned variable factors it is possible to produce a composition having a degree of thixotropy particularly adapted to the purpose for which the composition has been prepared. The thixotropic nature of the compositions of the present invention is particularly valuable when associated with a polyester monovinylidene aromatic compound mixture which has a low viscosity value, since it has been with such compositions that hitherto the drainage problem has been most marked. The thixotropy of the present compositions reduces the drainage of the compositions from the absorbent materials without affecting the good penetration of the absorbent material which results from the low viscosity of the composition.

The curing of the bonding compositions of the present invention may be achieved by any of the techniques which have hitherto been employed in the production of articles from absorbent material impregnated with unsaturated polyester resin compositions. The rate of cure may be adjusted by varying the amount of catalyst, promoter and inhibitor present in the bonding composition and also by varying the temperature at which the curing reaction is allowed to proceed.

The ambient temperature of the article, especially during the initial stages of the cure should not exceed 80° C. because if the temperature of the curing mass becomes too high the finely divided vinyl chloride polymer will soften and the bonding composition will lose its advantageous thixotropic properties with the reuslt that the physical properties of the cured product deteriorate. It is preferred to bring about the cure of the bonding compositions of the present invention at room temperature i. e. below 40° C. It should be noted that the curing of the compositions is normally a strongly exothermic reaction and consequently the temperature within an article under cure, especially if the article has considerable thickness, may rise considerably. However, in the process of the present invention the ambient temperature of the article while being cured is maintained below the softening point of the vinyl chloride polymer and thus a proportion of the bonding composition will be at a temperature below the softening point of the polymer and will thus retain its valuable thixotropic properties until the composition is set. It is preferred to bring about the cure of the bonding composition under such conditions that the temperature at any point within the article does not rise substantially above 100° C., preferably not above 80° C.

Any suitable dyes, pigments, fillers or plasticisers may be added to the bonding compositions used in the process of the present invention.

The bonding compositions of the present invention may be used in the preparation of articles in which the absorbent material has been impregnated with the composition in any known way, for example, brushing, dipping or spraying. Most conveniently, the composition is applied by brushing the absorbent material with the composition or, alternatively, by passing the absorbent material through one or more sets of rollers below the surface of a bath of the bonding composition. Where the impregnated material is a glass fibre sheet or mat it will be found that it can be built up into large complicated shapes possessing considerable vertical height without excessive drainage occurring.

The following examples show the preparation of bonding compositions and their use in the production of bonded articles from glass cloth according to the process of the present invention, the parts referred to being by weight.

*Example 1*

A polyester resin was prepared by mixing 3 moles of maleic anhydride with 1 mole of sebacic acid and 4 moles of diethylene glycol and heating the mixture in a well stirred flask under an atmosphere of carbon dioxide for 6 hours at 200° C. During this time water was evolved and the acid value fell to 30 to 40 mg. KOH/gm. The product was then allowed to cool and thinned with half its weight of styrene containing 500 parts per million of tertiary butyl catechol (T. B. C.).

To 150 parts of the resulting mixture was added 1 part of benzoyl peroxide, 0.1 part of dimethyl aniline and 20 parts of finely divided polyvinyl chloride sold under the trade name of Geon 121 and the whole mixture was rendered uniform by high speed stirring.

The resulting bonding composition was applied by brushing to plies of glass cloth supported on steel plates which were then hung vertically. There were no signs of flow of the material during the induction period lasting approximately one hour which preceded curing at room temperature. The resulting laminated sheet showed no signs of cracking or crazing and had good physical characteristics.

*Example 2*

1 mole of maleic anhydride, 1 mole of phthalic anhydride and 2.2 moles of 1:2 propylene glycol were reacted at 200° C. until an acid value of 30–40 mg. KOH/gm. was obtained. The product was then thinned with half its weight of styrene containing 500 p. p. m. of T. B. C. 2 parts of a 60% solution of methyl ethyl ketone. Peroxide in di-methyl phthalate and 0.5 part of cobalt naphthenate solution in white spirit were added to 150 parts of this solution, together with 10 parts of a finely divided sample of polyvinyl chloride (all particles less than 3 mu in diameter) which had been prepared by an emulsion process and contained a small proportion of residual emulsifying agent. The ingredients were mixed until homogeneous in a "Peerless" mixer. The resulting composition cured in 1–3 hours at room temperature. The cobalt naphthenate solution employed was of such concentration that it contained 6% of metal.

*Example 3*

1 mole of fumaric acid, 1 mole of phthalic anhydride, 1 mole of 1:2-propylene glycol and 1.2 moles of diethylene glycol were heated at 200° C. for 4–6 hours until an acid value of 35 mg. KOH/gm. was obtained. While the material was cooling, 300 parts per million of hydroquinone were added, followed by half its weight of styrene as soon as the temperature of the mass had fallen to 60° C. When cold, 2 parts of dry 1-hydroxy cyclohexyl hydroperoxide-1, 0.2 part of cobalt naphthenate solution and 15 parts of the same polyvinyl chloride sample used in Example 2 were added to 150 parts of solution to give a composition capable of setting in 2–4 hours at room temperature.

Example 4

This example employed the same alkyd as in Example 1 but it was thinned with ⅓ of its weight of di-allyl maleate together with ⅒ of its weight of styrene, containing T. B. C. equivalent to 500 parts per million of the mixture. 4 parts of the 60% methyl ethyl ketone peroxide solution and 0.1 part of manganese naphthenate (5% Mn in white spirit), and 10 parts of the same polyvinyl chloride sample used in Example 2 were added to a quantity of solution containing 100 parts of alkyd resin. This composition will cure in 3–5 hours at room temperature.

In the absence of the styrene a similar composition required 8 to 10 hours to cure at room temperature.

Example 5

A similar bonding composition to that produced in Example 2 was prepared by repeating the process but replacing the 10 parts of polyvinyl chloride with 5 parts of a finely divided copolymer of vinyl chloride and vinyl acetate containing about 4% of the latter. (This copolymer is sold under the trade name Bakelite VYNW.)

Example 6

A similar bonding composition to that produced in Example 3 was prepared by the same process, but the 15 parts of polyvinyl chloride were replaced with 15 parts of another sample of polyvinyl chloride sold under the trade name "Corvic PM."

All the bonding compositions prepared in Examples 2 to 6 inclusive were used for the production of laminated articles from a 2″ chopped glass fibre mat (2 oz./sq. ft.). In all cases substantially no drainage occurred from the vertical surfaces of the articles during the curing of the compositions at room temperature. For instance, laminates prepared from the bonding composition described in Example 3 by impregnating plies of 2″ chopped glass fibre mat (2 oz./sq. ft.) with the composition and allowing them to cure on a vertical plate at room temperature for two days, had the following physical properties.

Flexural strength _____ 23,000 lbs./sq. in.
Young's Modulus Inflexure _____ $1 \times 10^6$ lbs./sq. in.
Glass content _____ 30%.

A similar assembly was made up using as the bonding composition the same components as that described in Example 3 but without the polyvinyl chloride. During the initial stages of the curing so much bonding composition drained from the glass fibre mat that the final product was porous and entirely unsuitable for the construction of any article requiring mechanical strength.

We claim:

1. A process for the production of bonded articles which comprises impregnating fibrous absorbent material with a bonding composition consisting essentially of a poly-condensation product of a dicarboxylic acid with a dihydroxy alcohol wherein one of the two last mentioned components contains ethylenic unsaturation, a mono-ethylenically unsaturated compound corresponding to the formula

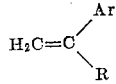

wherein Ar is mononuclear carbocyclic aryl containing no olefinic unsaturation and R is a member selected from the group consisting of hydrogen, chlorine and methyl, said mono-ethylenically unsaturated compound being interpolymerizable with said polycondensation product, and from 10 to 20% by weight based on the weight of the bonding composition of a finely divided material selected from the group consisting of polyvinyl chloride, copolymer of vinyl chloride and vinylidene chloride, copolymer of vinyl chloride and vinyl acetate and copolymer of vinyl chloride and acrylonitrile, said copolymers containing a major proportion of units derived from the vinyl chloride and a minor proportion of units derived from the other monomer, said finely divided material having a particle size ranging from 0.01 mu to 20 mu and forming a dispersion with other constituents of the bonding composition, and thereafter allowing said bonding composition to cure at an ambient temperature below 80° C.

2. A process as claimed in claim 1, wherein the compound corresponding to the said formula is styrene.

3. A process as claimed in claim 1, wherein the finely divided material has been produced by an emulsion polymerisation process.

4. A process as claimed in claim 1, wherein the finely divided material is a copolymer of vinyl chloride with less than 10% of vinyl acetate.

5. A process as claimed in claim 1, wherein the bonding composition contains from 1 to 5% by weight of the vinyl chloride polymer of a dispersing agent.

6. A process as claimed in claim 1, wherein the cure of the composition takes place at an ambient temperature below 40° C.

7. A process as claimed in claim 1, wherein the cure of the bonding composition is brought about under such conditions that the temperature at any point within the article does not rise substantially above 100° C.

8. A process for the production of bonded articles which comprises impregnating fibrous absorbent material with a bonding composition consisting essentially of poly-condensation product of a dihydric alcohol with an α-ethylenically-unsaturated α, β-dicarboxylic acid mixed with a saturated dicarboxylic acid, a mono-ethylenically unsaturated compound corresponding to the formula

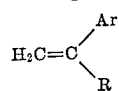

wherein Ar is mononuclear carbocyclic aryl containing no olefinic unsaturation and R is a member selected from the group consisting of hydrogen, chlorine and methyl, said mono-ethylenically unsaturated compound being interpolymerizable with said poly-condensation product, and from 10 to 20% by weight based on the weight of the bonding composition of a finely divided material selected from the group consisting of polyvinyl chloride, copolymer of vinyl chloride and vinylidene chloride, copolymer of vinyl chloride and vinyl acetate and copolymer of vinyl chloride and acrylonitrile, said copolymers containing a major proportion of units derived from the vinyl chloride and a minor proportion of units derived from the other monomer, said finely divided material having a particle size ranging from 0.01 mu to 20 mu and forming a dispersion with other constituents of the bonding composition, and thereafter allowing said bonding composition to cure at an ambient temperature below 80° C.

9. A process as claimed in claim 8 wherein the compound corresponding to the said formula is styrene and the ratio of styrene to modified poly-condensation product is in the range 1:3 to 1:1.

References Cited in the file of this patent

UNITED STATES PATENTS

| | | |
|---|---|---|
| 2,155,590 | Garvey | Apr. 25, 1939 |
| 2,464,568 | Flynn et al. | Mar. 15, 1949 |
| 2,498,621 | Kropa et al. | Feb. 21, 1950 |
| 2,567,719 | Loritsch et al. | Sept. 11, 1951 |
| 2,639,252 | Simon et al. | May 19, 1953 |
| 2,642,403 | Simon et al. | June 16, 1953 |

FOREIGN PATENTS

| | | |
|---|---|---|
| 915,080 | France | July 8, 1946 |

UNITED STATES PATENT OFFICE
CERTIFICATE OF CORRECTION

Patent No. 2,851,379 September 9, 1958

Johann Josef Peter Staudinger et al.

It is hereby certified that error appears in the printed specification of the above numbered patent requiring correction and that the said Letters Patent should read as corrected below.

Column 6, line 48, for "ketone. Peroxide" read -- ketone peroxide --.

Signed and sealed this 30th day of December 1958.

(SEAL)
Attest:

KARL H. AXLINE
Attesting Officer

ROBERT C. WATSON
Commissioner of Patents